(12) United States Patent
Mikoshiba (10) Patent No.: US 11,769,494 B2
(45) Date of Patent: Sep. 26, 2023

(54) INFORMATION PROCESSING APPARATUS AND DESTINATION SEARCH METHOD

(71) Applicant: Konica Minolta, Inc., Tokyo (JP)

(72) Inventor: Yusuke Mikoshiba, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 404 days.

(21) Appl. No.: 17/231,321

(22) Filed: Apr. 15, 2021

(65) Prior Publication Data

US 2021/0358485 A1    Nov. 18, 2021

(30) Foreign Application Priority Data

May 14, 2020   (JP) ................................. 2020-084935

(51) Int. Cl.
| | |
|---|---|
| *G10L 15/00* | (2013.01) |
| *G10L 15/18* | (2013.01) |
| *G06F 40/295* | (2020.01) |
| *G10L 15/22* | (2006.01) |
| *G10L 15/30* | (2013.01) |
| *G10L 15/08* | (2006.01) |

(52) U.S. Cl.
CPC ............ *G10L 15/18* (2013.01); *G06F 40/295* (2020.01); *G10L 15/005* (2013.01); *G10L 15/22* (2013.01); *G10L 15/30* (2013.01); *G10L 2015/081* (2013.01)

(58) Field of Classification Search
None
See application file for complete search history.

(56) References Cited

U.S. PATENT DOCUMENTS

| | | | |
|---|---|---|---|
| 10,614,487 B1* | 4/2020 | Tushinskiy | ............. G10L 15/22 |
| 11,626,111 B2* | 4/2023 | Yoshimi | ................. G10L 15/30 |
| | | | 704/251 |
| 2019/0362708 A1* | 11/2019 | Kitaguchi | ............... G10L 15/26 |
| 2021/0217413 A1* | 7/2021 | Tushinskiy | ........ H04N 21/2668 |
| 2021/0358477 A1* | 11/2021 | Kitaguchi | ............... G10L 15/05 |

FOREIGN PATENT DOCUMENTS

JP          2010147624 A       7/2010

* cited by examiner

*Primary Examiner* — Satwant K Singh
(74) *Attorney, Agent, or Firm* — BUCHANAN INGERSOLL & ROONEY PC (57) ABSTRACT

An information processing apparatus is connected to a voice processing server that analyzes text data transmitted from a voice input/output apparatus that converts an instruction by an utterance of a user to the text data and outputs the text data, and outputs an instruction obtained by analysis and utterance language information indicating a language of the utterance, and the information processing apparatus includes: a communicator that communicates with the voice processing server; a destination searcher that determines on the basis of the utterance language information whether to include a space character in a target of the search, and searches for a name indicated in a search character string from a destination list on the basis of a result of the determination; and a hardware processor that performs control to transmit a search result of a destination by the destination searcher to the voice processing server via the communicator.

7 Claims, 8 Drawing Sheets

INFORMATION PROCESSING APPARATUS AND DESTINATION SEARCH METHOD

The entire disclosure of Japanese patent Application No. 2020-084935, filed on May 14, 2020, is incorporated herein by reference in its entirety.

BACKGROUND

Technological Field

The present invention relates to an information processing apparatus and a destination search method.

Description of the Related Art

Conventionally, voice input/output apparatuses such as smart speakers that convert a voice uttered by a user into text data and output it have been known, and apparatuses that enable a voice operation by the user by linking with the voice input/output apparatus have been increasing.

Some of the above-mentioned apparatuses provide a function of searching a destination to which various data handled by the apparatus is transmitted by using a name instructed by a voice operation as a search character string. For example, when the language uttered by the user is English, the text data transmitted to the apparatus linked with the voice input/output apparatus has a space character between the last name and the first name of a name such as "Search Tom Brown". This is because in English, there is a space between words that compose a sentence.

On the other hand, when the language uttered by the user is a language such as Japanese, Korean, or Chinese, there is no space character between the last name and the first name in the text data transmitted to the apparatus. This is because in these languages, there is no space between words that compose a sentence. Therefore, when the utterance language is Japanese, Korean, Chinese, or the like, even when the name is registered with a space character inserted between the last name and the first name in a destination list to be searched, text data with no space character inserted between the last name and the first name is transmitted to the apparatus such as "Search by 山田太郎".

In this case, the apparatus compares the name indicated in the text data that does not include a space character between the last name and the first name with the registered name of the destination that includes a space character between the last name and the first name. Therefore, even though the corresponding name such as "山田" 太郎 is actually registered, a phenomenon may occur in which it is erroneously determined that the corresponding name does not exist.

For example, JP 2010-147624 A discloses a technique in which among entries registered in an address book, an entry is extracted in which "reading" includes a first search term which is a recognition result obtained by voice recognition processing and "name" includes a second search term which is a kanji obtained by kana-kanji conversion processing on a character accepted by a character input unit.

However, in the technique described in JP 2010-147624 A, the user needs to input characters to the character input unit in addition to voice input to a voice input unit, which requires time and effort for the user. As a method for preventing the occurrence of the above-mentioned phenomenon in which it is determined that there is no corresponding name even though the corresponding name is actually registered, the methods described below are conceivable.

(1) Allowing insertion of a space between the last name and the first name of a name used for searching even when the utterance language is Japanese by explicitly instructing the input of a space character, for example, by uttering the word "space" between the last name and the first name.
(2) Deleting the space character between the last name and the first name and registering the name in the destination list in which the name specified as the destination and the destination are managed.
(3) Separately introducing a text analysis mechanism that separates the last name and the first name of a name.

However, when the method (1) is adopted, it is necessary for the user who performs the destination search to explicitly utter the space input each time the search is performed, which requires the time and effort for the user. When the method (2) is adopted, it is necessary to change whether to insert a space character between the last name and the first name when registering the destination name depending on the language, and it is difficult to manage the address book in a multilingual environment. When the method (3) is adopted, it takes extra time for text analysis, and it is conceivable that it takes time from the search instruction by voice utterance to the completion of execution of search.

SUMMARY

The present invention has been made in view of such a situation. An object of the present invention is to enable accurate destination search by voice operation without requiring the time and effort for a user or an administrator of a destination list and without deteriorating the performance of a conversation flow.

To achieve the abovementioned object, according to an aspect of the present invention, there is provided an information processing apparatus that is connected to a voice processing server that analyzes text data transmitted from a voice input/output apparatus that converts an instruction by an utterance of a user to the text data and outputs the text data, and outputs an instruction obtained by analysis and utterance language information indicating a language of the utterance, and the information processing apparatus reflecting one aspect of the present invention comprises: a communicator that communicates with the voice processing server; a destination searcher that, when the instruction output from the voice processing server and received by the communicator is a destination search instruction using a name as a search character string, determines on the basis of the utterance language information whether to include a space character in a target of the search in a case where the space character is included between a last name and a first name of the name in a destination list in which the name and information of destination of the name are registered, and searches for the name indicated in the search character string from the destination list on the basis of a result of the determination; and a hardware processor that performs control to transmit a search result of the destination by the destination searcher to the voice processing server via the communicator.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

[Configuration of the Image Processing System]

Figure 1:
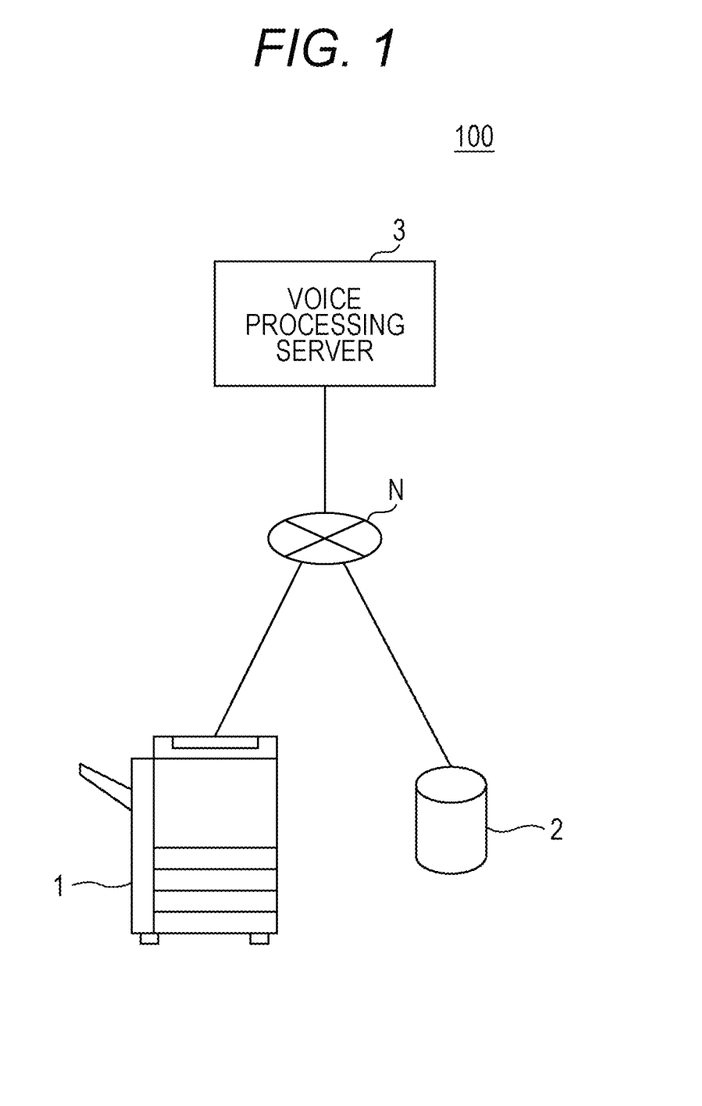
FIG. 1 is a schematic configuration diagram of an image processing system according to a first embodiment of the present invention.

First, the configuration of the image processing system according to the first embodiment of the present invention will be described with reference to FIG. 1. FIG. 1 is a schematic configuration diagram of an image processing system 100 according to the first embodiment of the present invention.

The image processing system 100 illustrated in FIG. 1 includes an image forming apparatus 1 (an example of the information processing apparatus), a voice input/output apparatus 2, and a voice processing server 3. The voice input/output apparatus 2 and the voice processing server 3 and the voice processing server 3 and the image forming apparatus 1 are connected via a network N including a public switched telephone network or an internet protocol (IP) network.

The image forming apparatus 1 includes, for example, a multi-functional peripheral (MFP) having a copy function, a printer function, a scanner function, and the like. The image forming apparatus 1 forms an image on paper on the basis of image data transmitted from a terminal apparatus or the like, which is not illustrated, and outputs the paper on which the image is formed as a printed matter. The image forming apparatus 1 also transmits scan data or the like read by the scanner function to the destination specified by a voice operation to the voice input/output apparatus 2 or by the operation on an operation display unit 13 (see FIG. 2).

The voice input/output apparatus 2 includes, for example, a smart speaker, and includes a microphone and a speaker, which are not illustrated. The voice input/output apparatus 2 converts the voice collected by the microphone, for example, an instruction uttered by the user into text data, and transmits the text data to the voice processing server 3. At this time, at the time of transmitting the text data, the voice input/output apparatus 2 also transmits information of the utterance language (Japanese, English, or the like) determined at the time of receiving an activation word (hereinafter, also referred to as "utterance language information") to the voice processing server 3. The voice input/output apparatus 2 reproduces voice information transmitted from the voice processing server 3 and releases it through the speaker.

The voice processing server 3 is provided, for example, on a cloud, which is not illustrated, and its function is provided as a cloud application service. The voice processing server 3 performs syntax analysis on the text data transmitted from the voice input/output apparatus 2, and transmits an instruction to the image forming apparatus 1 corresponding to the result of the voice analysis processing to the image forming apparatus 1. The instruction to the image forming apparatus 1 corresponding to the result of the voice analysis processing includes a destination search instruction using the name included in the text data transmitted from the voice input/output apparatus 2 as a search character string.

In the present embodiment, an example in which the voice processing server 3 is provided on the cloud is given, but the present invention is not limited to this. The voice processing server 3 may be provided inside the image forming apparatus 1, or may be provided inside an on-premises server or the like, which is not illustrated. Between the voice processing server 3 and the image forming apparatus 1, a relay server or the like may be provided that performs processing such as receiving voice information about a job from the voice processing server 3 and storing it, or passing the job to the image forming apparatus 1.

[Configuration of the Control System of the Image Forming Apparatus and the Voice Processing Server]

Figure 2:
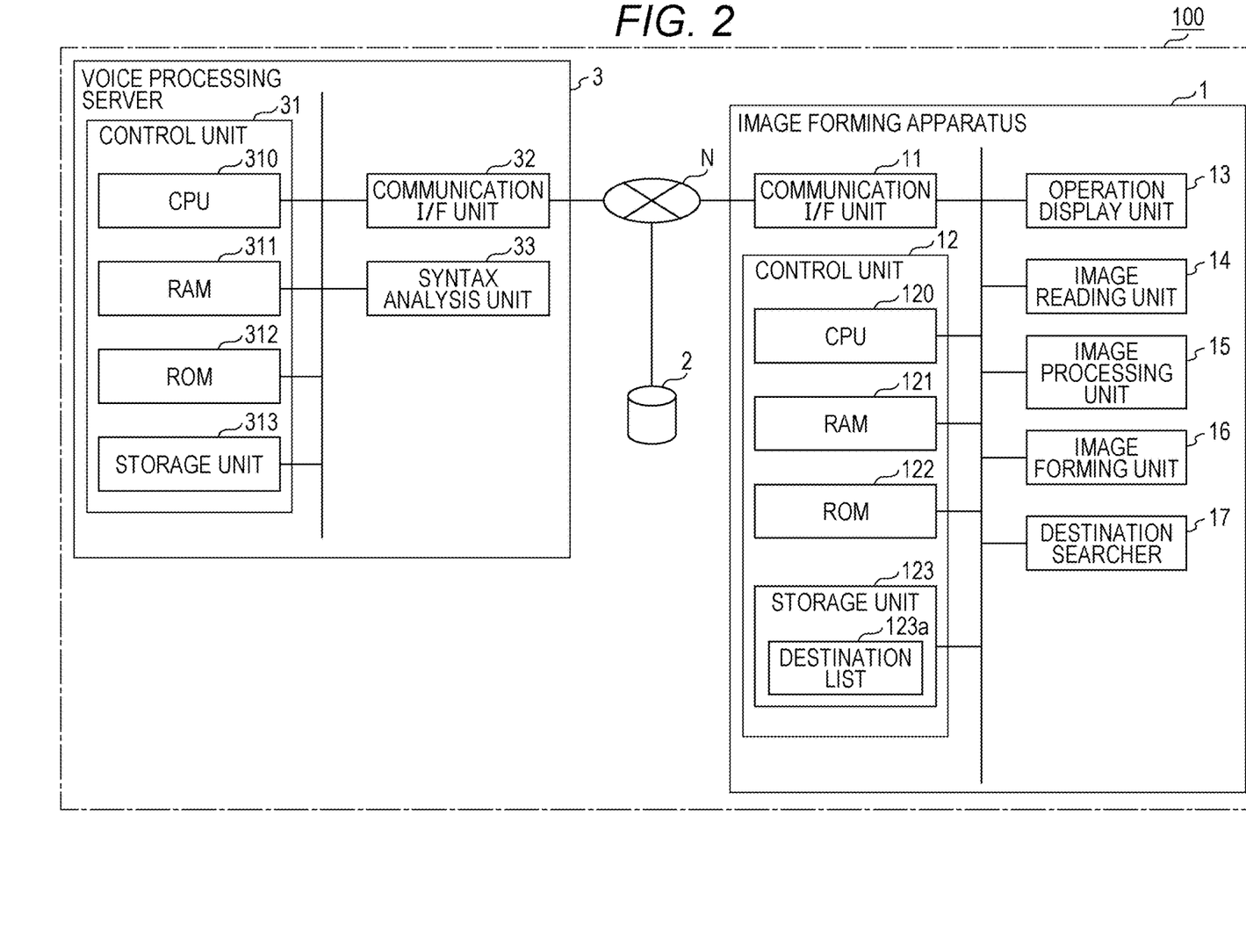
FIG. 2 is a block diagram illustrating a configuration example of a control system of an image forming apparatus and a voice processing server according to the first embodiment of the present invention.

Next, the configuration of the control system of the image forming apparatus 1 and the voice processing server 3 will be described with reference to FIG. 2. FIG. 2 is a block diagram illustrating a configuration example of the control system of the image forming apparatus 1 and the voice processing server 3.

[Configuration of the Control System of the Image Forming Apparatus]

First, the configuration of the control system of the image forming apparatus 1 will be described. As illustrated in FIG. 2, the image forming apparatus 1 includes a communication I/F (interface) unit 11, a control unit 12, the operation display unit 13, an image reading unit 14, an image processing unit 15, and an image forming unit 16, and the destination searcher 17.

The communication I/F unit 11 (an example of the communicator) controls an operation of transmitting and receiving various data performed with the voice processing server 3 connected via the network N.

The control unit 12 includes a central processing unit (CPU) 120, a random access memory (RAM) 121, a read only memory (ROM) 122, and a storage unit 123.

The CPU 120 reads various processing programs such as a system program, an image forming processing program, and a destination search program stored in the ROM 122, loads them in the RAM 121, and controls the operation of each unit of the image forming apparatus 1 according to the loaded programs. For example, the CPU 120 activates a voice processing function (not illustrated) of the image forming apparatus 1 on the basis of the instruction input from the voice processing server 3, and causes each unit that realizes the voice processing function to execute various instructions based on the voice operation.

Specifically, when the instruction input from the voice processing server 3 is an instruction of searching the destination to which the scan data is transmitted, the CPU 120 controls the destination searcher 17 that realizes the voice processing function to search for the name input by a voice with respect to a destination list 123a. When the search result is found, the CPU 120 also controls to transmit the search result to the voice processing server 3 via the communication I/F unit 11. The CPU 120 also controls the transmission of the scan data to the destination of the search result.

The RAM 121 temporarily stores data necessary for the CPU 120 to execute a program and image data (scanned image data, printed image data, finished preview image data).

The ROM 122 includes a non-volatile memory such as a semiconductor memory, and stores a system program corresponding to the image forming apparatus 1, various programs that can be executed on the system program, and the like. The program stored in the ROM 122 is stored in the form of a program code that can be read by a computer, and the CPU 120 sequentially executes operations according to the program code.

The storage unit 123 includes a hard disk drive (HDD), a solid state drive (SSD), or the like, and stores various setting data and image data related to the image forming apparatus 1, the destination list 123a that stores information of names searched as the destination and the destination, and the like. In the destination list 123a, the information of the user's name and the information of the destination such as an e-mail address or a telephone number are managed in association with each other.

The operation display unit 13 is configured as a touch panel in which, for example, a display unit including a liquid crystal display (LCD), an organic electroluminescence (EL), or the like and an operation inputter including a touch sensor or the like are integrally formed. On the display unit of the operation display unit 13, for example, a setting screen or the like for setting various jobs such as copying, scanning, and printing is displayed.

In the present embodiment, an example in which the display unit and the operation inputter are integrally formed as the operation display unit 13 is given, but the present invention is not limited to this. The display unit and the operation inputter including a keyboard, a mouse, or the like may be configured separately. Alternatively, in addition to the operation display unit 13 configured as a touch panel, an operation inputter including a keyboard, a mouse, or the like may be provided.

The image reading unit 14 optically reads image data from a document placed on a document table, which is not illustrated. The image reading unit 14 includes an image sensor including a charge coupled device (CCD), a complementary metal oxide semiconductor (CMOS) or the like, scanning control for controlling scanning by the image sensor, and the like (which are all not illustrated). The image sensor receives light emitted from a light source, which is not illustrated, and reflected from the document, and converts the light into an electric signal. A scanning control unit controls the operation of the image sensor, processes the electric signal output from the image sensor, and the like.

The image processing unit 15 performs various image processing such as color adjustment, density adjustment, contrast adjustment, color scheme conversion, image size adjustment, and character width adjustment in the image with respect to the image data transmitted from a terminal apparatus, which is not illustrated.

The image forming unit 16 forms an image on paper on the basis of the image data processed by the image processing unit 15 and outputs the paper on which the image is formed as a printed matter. The image forming unit 16 includes a charging apparatus, a photosensitive drum, an exposure apparatus, a transfer belt, and a fixing apparatus (all of which are not illustrated).

The image forming unit 16 first causes the exposure apparatus to emit light corresponding to an image to the photoconductor drum charged by the charging apparatus so as to form an electrostatic latent image on the periphery of the photosensitive drum. Next, the image forming unit 16 develops a toner image by adhering a toner on the charged electrostatic latent image by supplying the toner from a developing apparatus to the photoconductor. Next, the image forming unit 16 primarily transfers the toner image to the transfer belt, secondarily transfers the toner image transferred to the transfer belt to the paper, and further causes the fixing apparatus to fix the toner image transferred to the paper on the paper.

In the present embodiment, an example in which the image forming unit 16 forms an image by using an electrophotographic method is given, but the present invention is not limited to this. In the image processing system and the image forming apparatus of the present invention, an image forming unit that forms an image using another method such as an inkjet method may be used.

The destination searcher 17 is a unit that bears one of the voice processing functions of the image forming apparatus 1, and searches for the name indicated in the search character string transmitted from the voice processing server 3 from the destination list 123a. Specifically, the destination searcher 17 determines whether to perform the destination search including the space character between the last name and the first name of the name registered in the destination list 123a or to perform the destination search without including the space character on the basis of the utterance language information transmitted together with the search character string, and searches for the name on the basis of the result of the determination.

For example, when the utterance language information indicates that the utterance language is a language in which there is no space between the last name and the first name in the uttered voice and when there is a space between the last name and the first name of the name registered in the destination list 123a, the destination searcher 17 searches for the search character string, ignoring the space between the last name and the first name in the destination list 123a. Languages in which there is no space between the last name and the first name in an uttered voice include, for example, Japanese, Korean, and Chinese.

On the other hand, when the utterance language information indicates that the utterance language is a language in which there is a space between the last name and the first name in the uttered voice, the destination searcher 17 searches for the search character string including the space between the last name and the first name in the destination list 123a. Languages in which there is a space between the last name and the first name in an uttered voice include, for example, English, French, and German.

When the destination search instruction is input via the operation display unit 13, the destination searcher 17 searches for the specified name including the space character between the last name and the first name of the name registered in the destination list 123a.

[Configuration of the Control System of the Voice Processing Server]

Next, the configuration of the control system of the voice processing server 3 will be described similarly with reference to FIG. 2. As illustrated in FIG. 2, the voice processing server 3 includes a control unit 31, a communication I/F unit 32, and a syntax analysis unit 33.

The control unit 31 includes a CPU 310, a RAM 311, a ROM 312, and a storage unit 313.

The CPU 310 reads various processing programs such as a system program and a voice processing program stored in the ROM 312, loads them in the RAM 311, and controls the operation of each unit of the voice processing server 3 according to the loaded programs.

For example, when the text data is transmitted from the voice input/output apparatus 2, the CPU 310 performs control to cause the syntax analysis unit 33 to analyze the text data and cause various instructions obtained through the analysis by the syntax analysis unit 33 to be transmitted to the image forming apparatus 1 via the communication I/F unit 32.

The RAM 311 forms a work area for temporarily storing various programs executed by the CPU 310 and data related to these programs.

The ROM 312 includes a non-volatile memory such as a semiconductor memory, and stores a system program corresponding to the voice processing server 3, voice processing programs that can be executed on the system program, and the like. These programs are stored in the form of a program code that can be read by a computer, and the CPU 310 sequentially executes operations according to the program code.

The storage unit 313 includes an HDD, an SSD, or the like, and stores various setting data related to the voice processing server 3, instructions related to an image processing job associated with the result of the voice analysis by the syntax analysis unit 33, and the like.

The communication I/F unit 32 controls an operation of transmitting and receiving various data performed with the voice input/output apparatus 2 connected via the network N.

The syntax analysis unit 33 performs syntax analysis on the text data transmitted from the voice input/output apparatus 2, reads instructions corresponding to the analysis result, such as destination search instructions, setting instructions for various setting items, and job start instructions, from the storage unit 313, and outputs the instructions to the control unit 31.

[Destination Search Processing by the Image Processing System]

Figure 3:
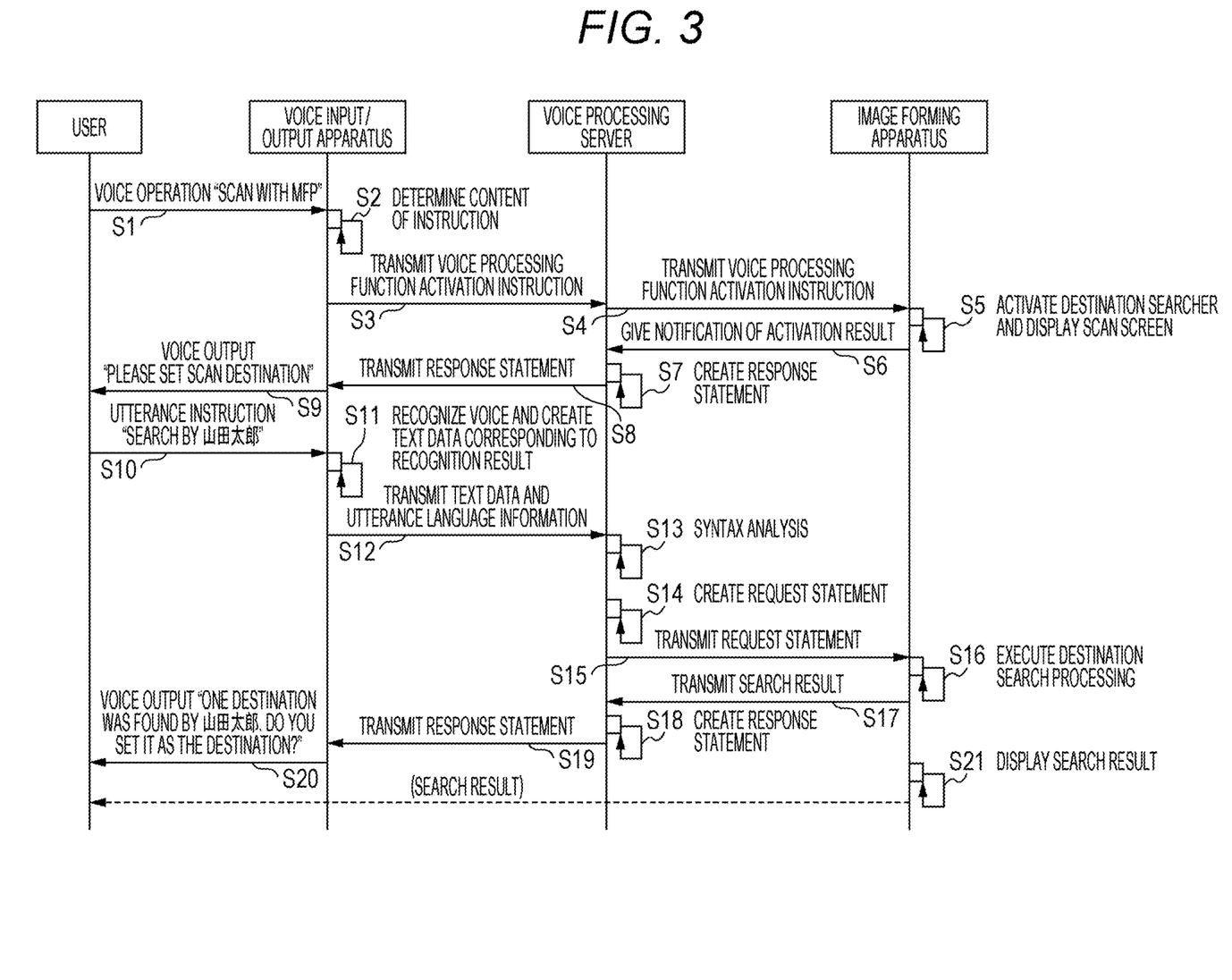
FIG. 3 is a sequence diagram illustrating an example of a procedure of destination search processing by the image processing system according to the first embodiment of the present invention.

Next, the procedure of the destination search processing by the image processing system 100 will be described with reference to FIG. 3. FIG. 3 is a sequence diagram illustrating an example of the procedure of the destination search processing by the image processing system 100.

First, the voice operation is input by the user uttering "scan with the MFP" to the voice input/output apparatus 2 (step S1). Next, the voice input/output apparatus 2 determines the content of the instruction input in step S1 (step S2). In step S2, the voice input/output apparatus 2 determines the language uttered by the user (utterance language), the type of the function in the image forming apparatus 1 to be activated on the basis of the voice operation, and the processing the image forming apparatus 1 should perform after the function is activated. The utterance language is determined on the basis of the activation word input by the user prior to step S1.

For example, the voice input/output apparatus 2 determines that the utterance language is "Ja-JP" (Japanese), the function to be activated is the "voice processing function", and the processing to be performed after the voice processing function is activated is "scanning".

Next, the voice input/output apparatus 2 transmits a voice processing function activation instruction to the voice processing server 3 (step S3). In step S3, the voice input/output apparatus 2 also transmits the content of the instruction determined in step S2 (the utterance language information, the type of the function in the image forming apparatus 1 to be activated, and the processing the image forming apparatus 1 should perform after the function is activated) as the voice processing function activation instruction.

Next, the control unit 31 (see FIG. 2) of the voice processing server 3 transmits the voice processing function activation instruction transmitted from the voice input/output apparatus 2 in step S3 to the image forming apparatus 1 via the communication I/F unit 32 (step S4). Next, the control unit 12 of the image forming apparatus 1 activates the destination searcher 17 that realizes the voice processing function, and causes the operation display unit 13 to display a scan screen for performing a scan operation (step S5).

Next, the control unit 12 of the image forming apparatus 1 notifies the voice processing server 3 of the activation result via the communication I/F unit 11 (step S6). Next, the control unit 31 of the voice processing server 3 generates a response statement based on the activation result transmitted in step S6 (step S7). Specifically, the control unit 31 of the voice processing server 3 generates a voice announcement sentence of which the user should be notified after the scan screen is activated in step S7.

Next, the control unit 31 of the voice processing server 3 transmits the response statement generated in step S7 to the voice input/output apparatus 2 via the communication I/F unit 32 (step S8). Next, the voice input/output apparatus 2 outputs a voice ("Please set the scan destination") corresponding to the response statement transmitted from the voice processing server 3 in step S8 through the speaker, which is not illustrated (step S9).

Next, the voice operation is input by the user uttering "Search by 山田太郎 " to the voice input/output apparatus 2 (step S10). Next, the voice input/output apparatus 2 recognizes the voice input by the user in step S10 and generates text data representing the recognition result (step S11). Next, the voice input/output apparatus 2 transmits the text data generated in step S11 and the utterance language information to the voice processing server 3 (step S12). Specifically, the voice input/output apparatus 2 transmits the text data "Search by 山田太郎 " and the utterance language information "Ja-JP" to the voice processing server 3.

Next, the syntax analysis unit 33 of the voice processing server 3 performs syntax analysis on the text data transmitted from the voice input/output apparatus 2 in step S12 (step S13). Next, the control unit 31 of the voice processing server 3 generates a request statement with respect to the image forming apparatus 1 on the basis of the result of the syntax analysis performed in step S13 (step S14). Specifically, the control unit 31 of the voice processing server 3 generates the request statement described below.

Request {job id: "1111", action: "Search", data " 山田太郎 ", language: "ja-JP"}

In the above request statement, "job id" is a job ID automatically assigned to a voice processing job, and "action: "Search"" indicates that the action to be executed by the image forming apparatus 1 is "destination search". In addition, "data: " 山田太郎 "" indicates that the search character string for the destination search is " 山田太郎 ", and "language: "ja-JP"" indicates that the utterance language is Japanese.

Next, the control unit 31 of the voice processing server 3 transmits the request statement generated in step S14 to the image forming apparatus 1 via the communication I/F unit 32 (step S15). Next, the destination searcher 17 of the image forming apparatus 1 executes the destination search processing on the basis of the request statement transmitted from the voice processing server 3 in step S15 (step S16). The destination search processing by the destination searcher 17 will be described in detail with reference to FIG. 4 below.

Next, the control unit 12 of the image forming apparatus 1 transmits the search result of the destination search processing in step S16 to the voice processing server 3 via the communication I/F unit 11 (step S17). Next, the control unit 31 of the voice processing server 3 generates a response statement based on the search result transmitted from the image forming apparatus 1 in step S17 (step S18).

Next, the control unit 31 of the voice processing server 3 transmits the response statement generated in step S18 to the voice input/output apparatus 2 via the communication I/F unit 32 (step S19). Next, the voice input/output apparatus 2 outputs a voice ("One destination was found by 山田太郎. Do you set it as the destination?") corresponding to the response statement transmitted from the voice processing server 3 in step S19 through the speaker, which is not illustrated (step S20). The control unit 12 of the image forming apparatus 1 displays the search result on the screen of the operation display unit 13 (step S21).

[Destination Search Processing by the Image Processing System]

Figure 4:
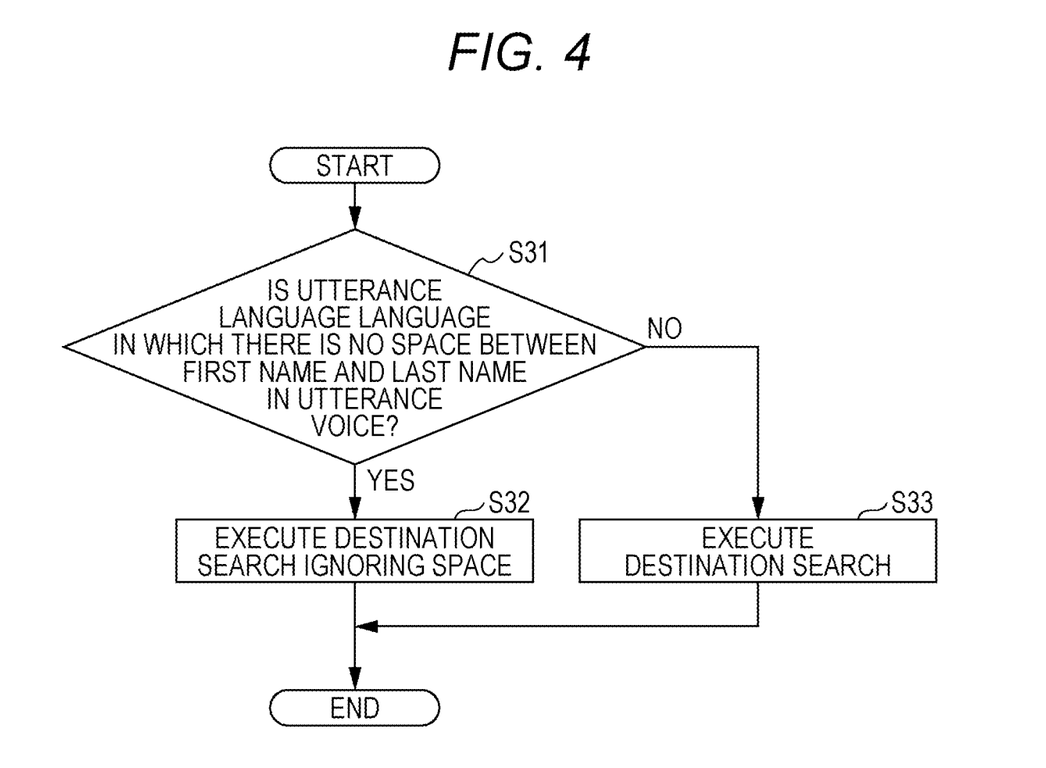
FIG. 4 is a flowchart illustrating an example of a procedure of destination search processing by a destination searcher according to the first embodiment of the present invention.

Next, the destination search processing by the destination searcher 17 of the image forming apparatus 1 will be described with reference to FIG. 4. FIG. 4 is a flowchart illustrating an example of the procedure of the destination search processing by the destination searcher 17.

First, the destination searcher 17 determines whether or not the utterance language of the user is a language in which there is no space between the last name and the first name in the uttered voice (step S31). When it is determined in step S31 that the language (for example, Japanese) does not include a space between the last name and the first name in the uttered voice (when YES in step S31), the destination searcher 17 executes the search, ignoring the space provided between the last name and the first name in the destination list 123*a* (FIG. 2) (step S32). Ignoring the space can be realized, for example, by performing processing of filtering the space portion.

On the other hand, when it is determined in step S32 that the language (for example, English) includes a space between the last name and the first name in the uttered voice (when NO in step S31), the destination searcher 17 executes the search of the destination (step S33).

In the above-described embodiment, the destination searcher 17 can perform the destination search when there is a space between the last name and the first name in the destination list 123*a* and when there is no space between the last name and the first name in the text data which is the analysis result of the uttered voice. Similarly, the destination search can also be performed when there is a space between the last name and the first name in the destination list 123*a* and when there is a space between the last name and the first name in the text data which is the analysis result of the uttered voice. That is, according to the present embodiment, the destination search by voice operation can be performed with high accuracy.

Therefore, the present embodiment removes the needs of causing the user to explicitly instruct the input of the space character by uttering the word "space" or the like, differentiating the registration form of names in the destination list 123*a* depending on the language, and separately introducing a text analysis mechanism that separates the last name and the first name of the name. Therefore, according to the present embodiment, the destination search by voice operation can be performed without requiring the time and effort for a user or an administrator who manages name information and without deteriorating the performance of a conversation flow.

Second Embodiment

[Configuration of the Image Processing System]

Figure 5:
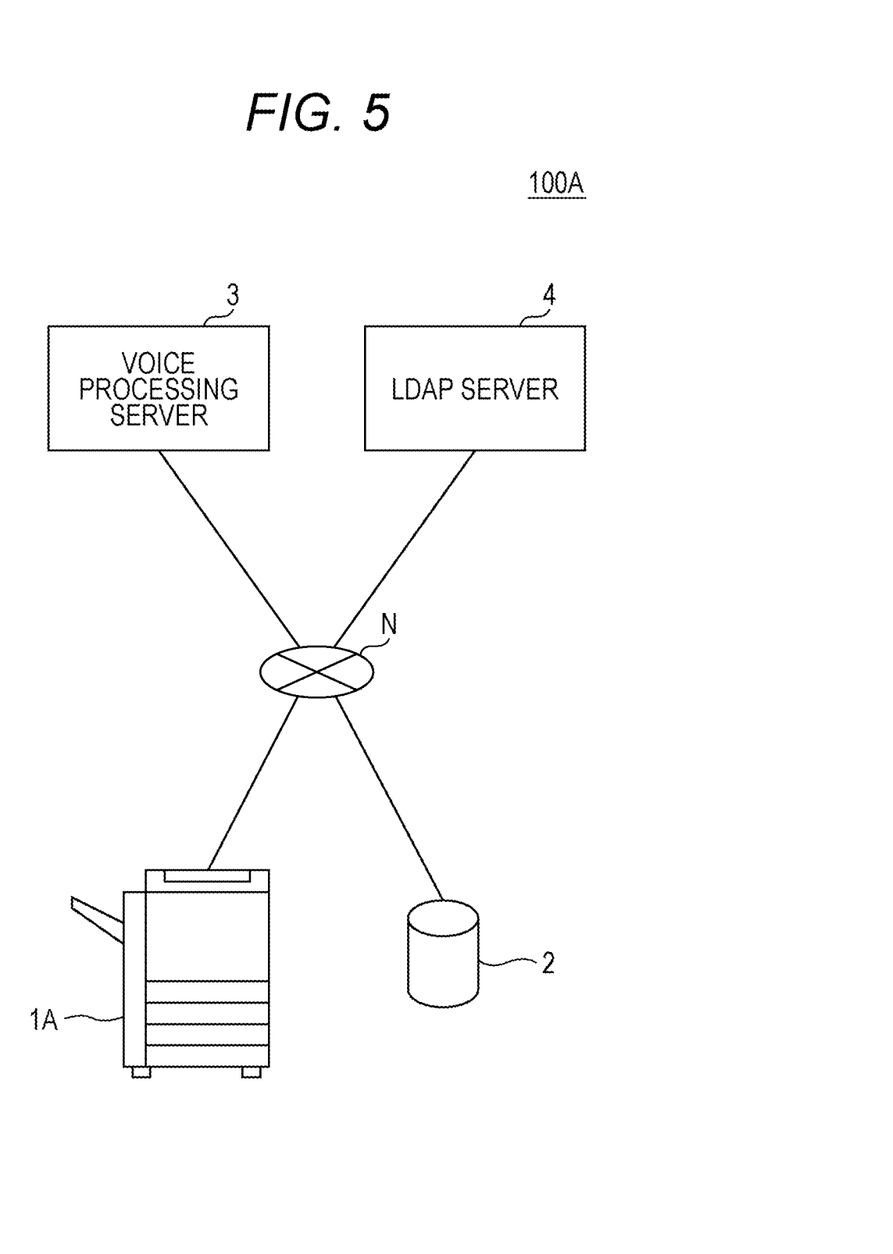
FIG. 5 is a schematic configuration diagram of an image processing system according to a second embodiment of the present invention.

Next, the configuration of the image processing system according to the second embodiment of the present invention will be described with reference to FIG. 5. FIG. 5 is a schematic configuration diagram of an image processing system 100A according to the second embodiment of the present invention.

The image processing system 100A illustrated in FIG. 5 includes an image forming apparatus 1A, the voice input/output apparatus 2, the voice processing server 3, and a lightweight directory access protocol (LDAP) server 4. Apparatuses (servers) constituting the image processing system 100A are connected via the network N including a public switched telephone network or an IP network. Since the voice input/output apparatus 2 and the voice processing server 3 are the same as those illustrated in FIG. 1, their description is omitted here.

The LDAP server 4 (an example of the destination list management server) is a server that manages a destination list (not illustrated) storing the names and destinations of users who use the image forming apparatus 1 and the like by using a directory service. In the present embodiment, the image forming apparatus 1A does not include the destination list 123*a* (see FIG. 2), and the destination list is managed by the LDAP server 4. The image forming apparatus 1A requests the LDAP server 4 to acquire the destination list when a preset predetermined timing arrives, and temporarily stores the destination list transmitted from the LDAP server 4 in a destination list storage area (not illustrated). The destination list storage area is formed, for example, in the RAM 121 or the storage unit 123.

The image forming apparatus 1A searches for the name in the destination list stored in the destination list storage area when a voice operation instructing the destination search is performed by the user, and, when the name of the search result is found, transmits the scan data or the like to the name as the destination Since the image forming apparatus 1A is the same as the image forming apparatus 1 illustrated in FIG. 1 except that it includes the destination list storage area instead of the destination list 123*a*, the description of the image forming apparatus 1A is omitted here. In the example illustrated in FIG. 5, an example in which the destination list storage area is provided in the image forming apparatus 1A is given, but the present invention is not limited to this. The destination list storage area may be provided in an external server, which is not illustrated, connected to the image forming apparatus 1A.

[Destination Search Processing by the Image Processing System]

Figure 6:
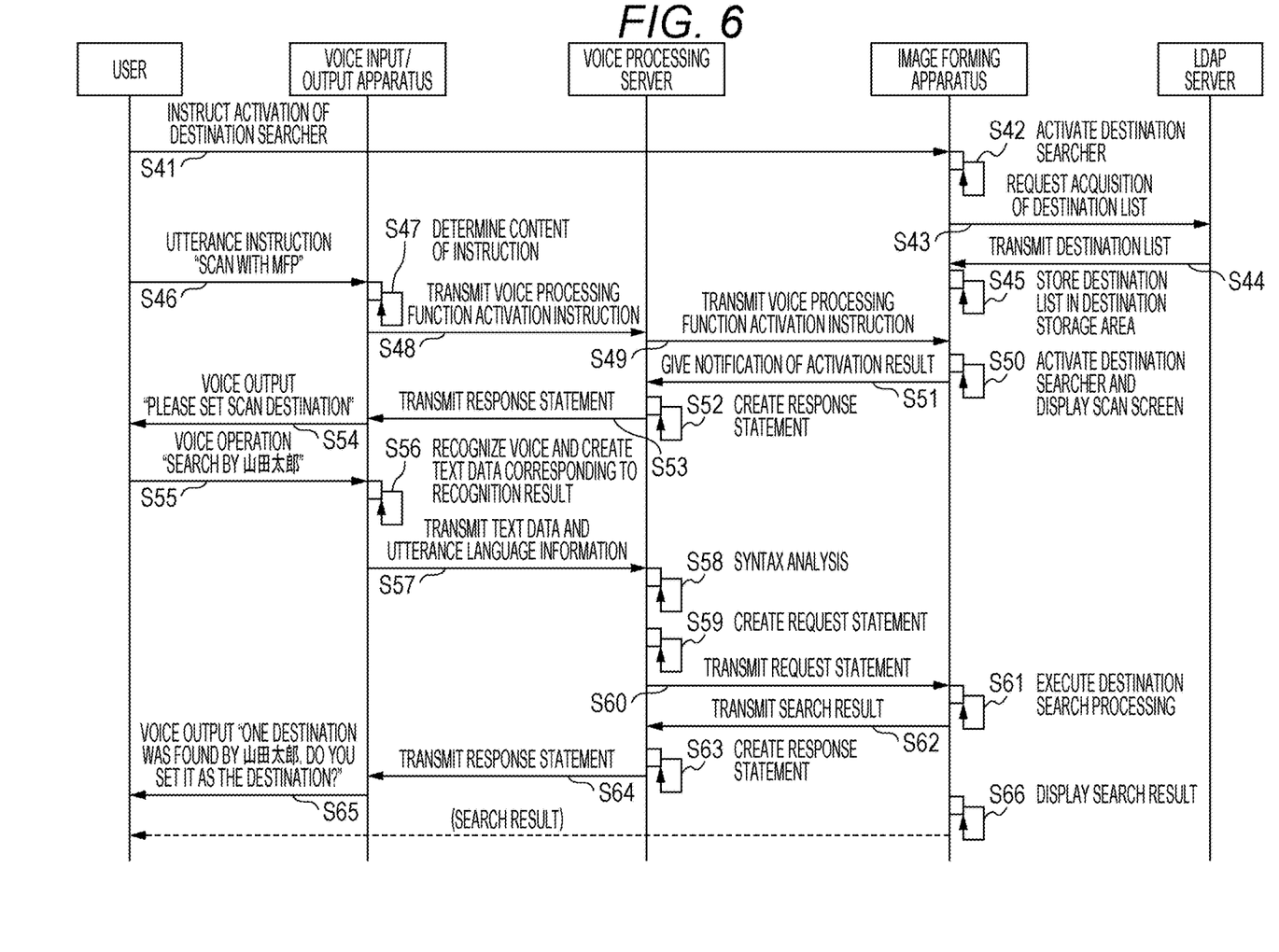
FIG. 6 is a sequence diagram illustrating an example of a procedure of destination search processing by the image processing system according to the second embodiment of the present invention.

Next, the procedure of the destination search processing by the image processing system 100A will be described with reference to FIG. 6. FIG. 6 is a sequence diagram illustrating an example of the procedure of the destination search processing by the image processing system 100A.

First, the activation of the destination searcher 17 of the image forming apparatus 1A is instructed by a voice operation from the user or when a preset predetermined timing arrives (step S41). Next, the destination searcher 17 of the image forming apparatus 1A is activated (step S42). As the preset predetermined timing at which the processing of step S41 is performed, a time that does not influence the flow of voice processing performed on the basis of the voice operation by the user is set, for example, at a certain o'clock every day. Alternatively, the activation of the destination searcher 17 and the processing of acquiring the destination list may be performed in the background in which some kind of processing is being performed by the image forming apparatus 1.

Next, the control unit 12 of the image forming apparatus 1A transmits a destination list acquisition request to the LDAP server 4 via the communication I/F unit 11 (step S43). Next, the LDAP server 4 transmits the destination list to the image forming apparatus 1A (step S44). Next, the control unit 12 of the image forming apparatus 1A stores the destination list transmitted in step S44 in the destination list storage area of the storage unit 123 (step S45). After the processing of acquiring the destination list is ended, the operation of the destination searcher 17 is stopped.

Since each processing from step S46 to step S60 is the same as each processing from step S1 to step S15 in FIG. 3, their descriptions are omitted here. When a request statement instructing the search of the destination is transmitted from the voice processing server 3 to the image forming apparatus 1A in step S60, the destination searcher 17 of the image forming apparatus 1A executes the destination search processing on the basis of the request statement (step S61).

The destination search processing performed in step S61 is the same as the processing illustrated in FIG. 4. That is, when the utterance language of the user is a language in which there is no space between the last name and the first name in the uttered voice, the destination searcher 17 executes the search, ignoring the space provided between the last name and the first name in the destination list. On the other hand, when the utterance language of the user is a language in which there is a space between the last name and the first name in the uttered voice, the destination search is executed.

In step S61, the destination searcher 17 searches for the name in the destination list stored in the destination list storage area in step S45. Since the processing from step S62 to step S66 is the same as the processing from step S17 to step S21 in FIG. 3, their descriptions are omitted here.

As indicated in the second embodiment described above, when the destination list is managed by the LDAP server 4, the name collation performed in the search of the destination list normally depends on a name collation rule of the LDAP server 4. Therefore, the processing of performing the search ignoring the space between the last name and the first name in the destination list cannot be executed, and the phenomenon can occur in which even though the corresponding name is registered, it is determined that there is no corresponding name.

However, in the second embodiment described above, the destination search processing is performed in the image forming apparatus 1A, not in the LDAP server 4. More specifically, the image forming apparatus 1A searches for the destination with respect to the destination list acquired from the LDAP server 4. Therefore, according to the present embodiment, it is possible to eliminate the dependence on the collation rule of the LDAP server 4 at the time of destination search, and the search can be executed according to the name registration form in the destination list. Therefore, according to the present embodiment, it is possible to search for the destination with high accuracy.

According to the present embodiment, similar to the first embodiment described above, the destination search by voice operation can be performed without requiring the time and effort for a user or an administrator of name information and without deteriorating the performance of a conversation flow.

<Variation Example of the Second Embodiment>

Figure 7:
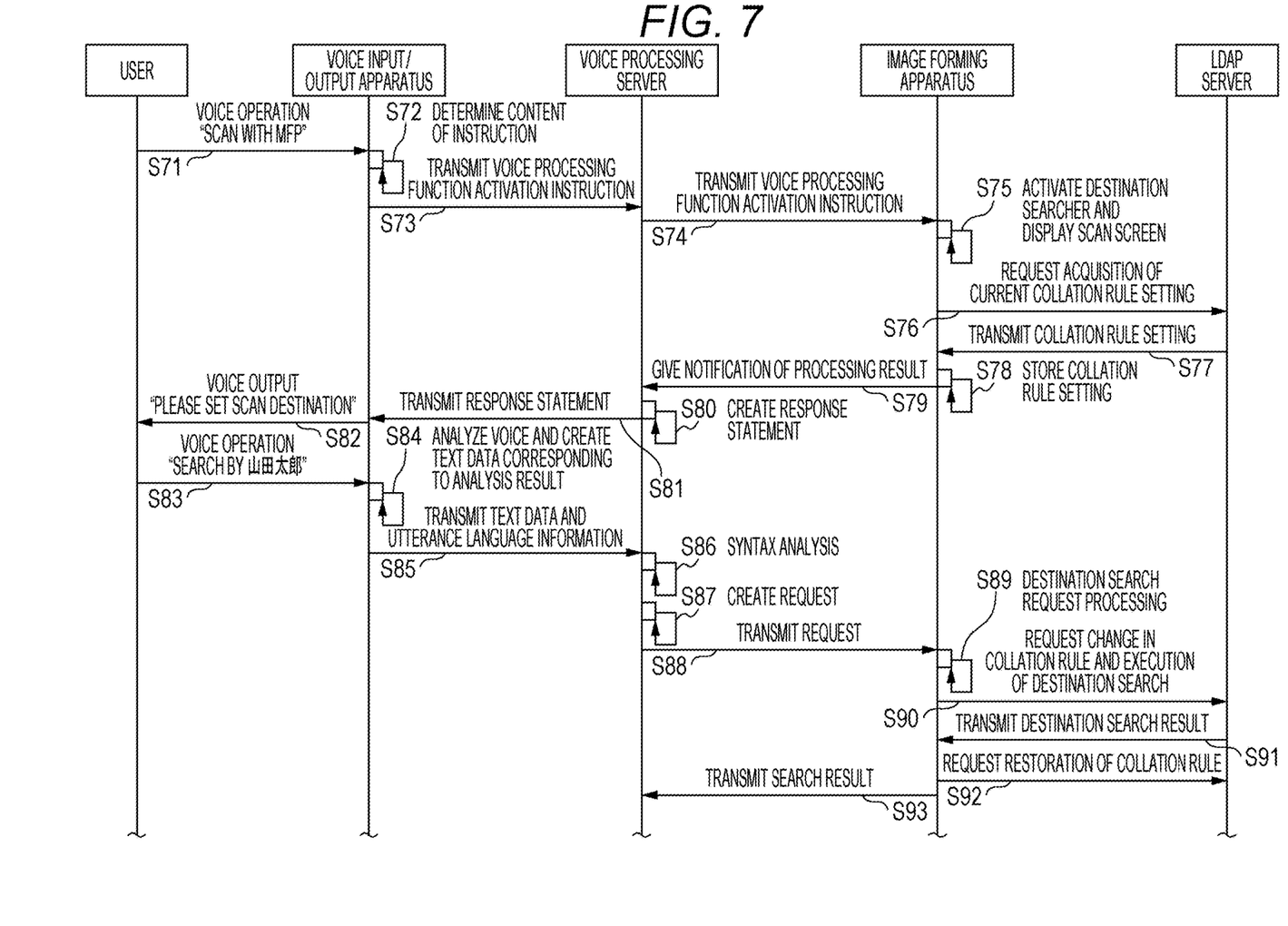
FIG. 7 is a sequence diagram illustrating an example of a procedure of destination search processing by an image processing system according to a variation example of the second embodiment of the present invention.
Figure 8:
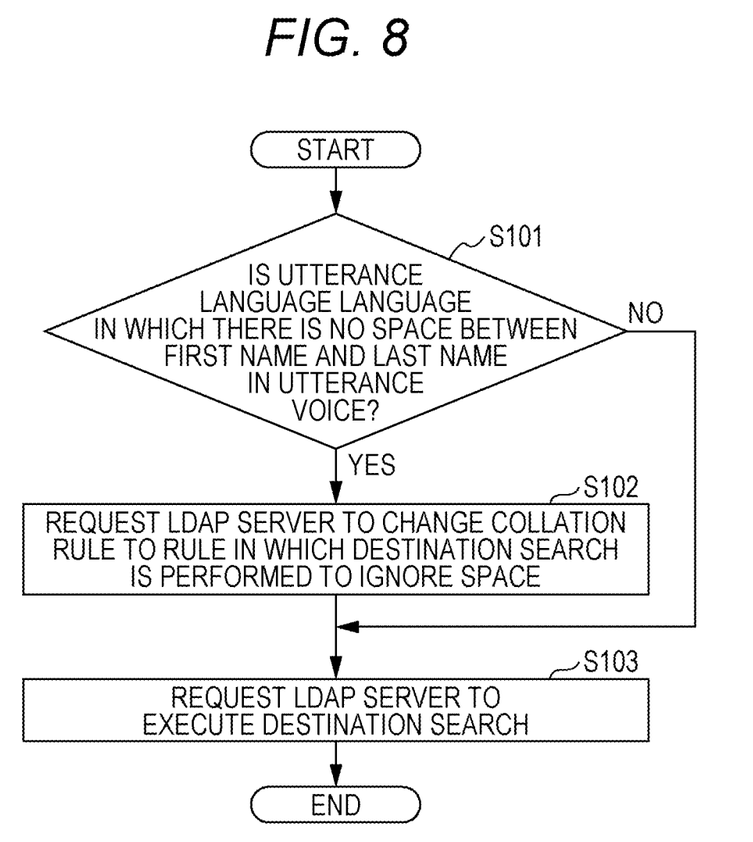
FIG. 8 is a flowchart illustrating an example of a procedure of destination search request processing by a destination searcher according to a variation example of the second embodiment of the present invention.

Next, the destination search processing by the image processing system 100A according to the variation example of the second embodiment of the present invention will be described with reference to FIGS. 7 and 8. FIG. 7 is a sequence diagram illustrating an example of the procedure of the destination search processing by the image processing system 100A, and FIG. 8 is a flowchart illustrating an example of the procedure of the destination search request processing by the destination searcher 17. In the variation example of the second embodiment, the destination searcher 17 of the image forming apparatus 1 requests a temporary change in collation rule and requests the destination search to the LDAP server 4.

[Destination Search Processing by the Image Processing System]

First, the destination search processing by the image processing system 100A will be described with reference to FIG. 7. Since each processing from step S71 to step S75 in FIG. 7 is the same as each processing from step S1 to step S5 in FIG. 3, their descriptions are omitted here. In step S75, when the destination searcher 17 is activated and the scan screen is displayed on the operation display unit 13 (see FIG. 5), the control unit 12 of the image forming apparatus 1A requests acquisition of the current collation rule setting to the LDAP server 4 (step S76).

Next, the LDAP server 4 transmits the current collation rule setting to the image forming apparatus 1A (step S77). Next, the control unit 12 of the image forming apparatus 1A stores the collation rule setting received in step S77 in the storage unit 123 or the like (step S78).

Since each processing from step S79 to step S88 is the same as each processing from step S6 to step S15 in FIG. 3, their descriptions are omitted here. When a request statement instructing the destination search is transmitted from the voice processing server 3 to the image forming apparatus 1A in step S88, the destination searcher 17 of the image forming apparatus 1A executes the destination search request processing on the basis of the request statement (step S89). The destination search request processing performed in step S89 will be described with reference to FIG. 8 below.

Next, the destination searcher 17 of the image forming apparatus 1A requests execution of the destination search to the LDAP server 4 (step S90). Next, the LDAP server 4 transmits the destination search result to the image forming apparatus 1A (step S91). Next, the control unit 12 of the image forming apparatus 1A requests restoration of the collation rule setting to the LDAP server 4 (step S92). Next, the control unit 12 of the image forming apparatus 1A transmits the search result received from the LDAP server 4 in step S91 to the voice processing server 3 via the communication I/F unit 11 (step S93).

After step S93, each processing from step S18 to step S21 in FIG. 3 is performed. That is, the voice processing server 3 generates a response statement according to the search result, and the response statement is transmitted to the voice input/output apparatus 2. Next, the voice input/output apparatus 2 outputs the voice corresponding to the response statement to the user, and the search result is displayed on the screen of the operation display unit 13 of the image forming apparatus 1A.

[Destination Search Request Processing by the Destination Searcher]

Next, the destination search request processing by the destination searcher 17 performed in step S90 of FIG. 7 will be described with reference to FIG. 8. First, the destination searcher 17 of the image forming apparatus 1A determines whether or not the utterance language of the user is a language in which there is no space between the last name and the first name in the uttered voice (step S101). When it is determined in step S101 that the language (for example, Japanese) does not include a space between the last name and the first name in the uttered voice (when YES in step S101), the destination searcher 17 requests the LDAP server 4 to change the collation rule of the search ignoring the space provided between the last name and the first name (step S102).

After processing in step S102 or when it is determined in step S101 that the language (for example, English) includes a space between the last name and the first name in the uttered voice of the user (when NO in step S101), the destination searcher 17 requests the LDAP server 4 to execute the destination search (step S103).

In the variation example of the second embodiment described above, when the utterance language of the user is a language in which there is no space between the last name and the first name in the uttered voice, the destination searcher 17 of the image forming apparatus 1A requests the LDAP server 4 to make a change to the collation rule of the search ignoring the space between the last name and the first name, and then requests execution of the destination search using the new collation rule. Therefore, according to the present variation example, the same effect as that of the second embodiment can be obtained.

In the present variation example, immediately after the destination search result is transmitted from the LDAP server 4, the control unit 12 of the image forming apparatus 1A requests restoration of the collation rule setting to the LDAP server 4. Therefore, according to the present variation example, the change period of the collation rule setting in the LDAP server 4 can be limited only to the time when the processing based on the voice operation is being performed, and it is possible to prevent the influence from being exerted on other systems using the LDAP server 4.

<Various Variation Examples>

The present invention is not limited to the above-described embodiments, and various other application examples and variation examples can be taken without departing from the gist of the present invention described in the claims.

In each of the above-described embodiments and variation examples, an example in which a smart speaker is used as the voice input/output apparatus 2 is given, but the present invention is not limited to this. As the voice input/output apparatus 2, a mobile terminal apparatus such as a mobile phone terminal or a smartphone may be used.

In each of the above-described embodiments and variation examples, an example in which the information processing apparatus is applied to the image forming apparatus 1 is given, but the present invention is not limited to this. The information processing apparatus of the present invention may be applied to an apparatus such as a printer controller that does not form an image or a personal computer (PC).

Although embodiments of the present invention have been described and illustrated in detail, the disclosed embodiments are made for purposes of illustration and example only and not limitation. The scope of the present invention should be interpreted by terms of the appended claims

What is claimed is:

1. An information processing apparatus that is connected to a voice processing server that analyzes text data transmitted from a voice input/output apparatus that converts an instruction by an utterance of a user to the text data and outputs the text data, and outputs an instruction obtained by analysis and utterance language information indicating a language of the utterance, the information processing apparatus comprising:
a communicator that communicates with the voice processing server;
a destination searcher that, when the instruction output from the voice processing server and received by the communicator is a destination search instruction using a name as a search character string, determines on the basis of the utterance language information whether to include a space character in a target of the search in a case where the space character is included between a last name and a first name of the name in a destination list in which the name and information of destination of the name are registered, and searches for the name indicated in the search character string from the destination list on the basis of a result of the determination; and
a hardware processor that performs control to transmit a search result of the destination by the destination searcher to the voice processing server via the communicator.

2. The information processing apparatus according to claim 1, wherein
the destination searcher, when the language indicated by the utterance language information is a language in which there is no space between a last name and a first name in an uttered voice and when a space character is included between the last name and the first name of the name registered in the destination list, searches for the name indicated in the search character string ignoring the space character.

3. The information processing apparatus according to claim 2, wherein
the destination searcher, when the language indicated by the utterance language information is a language in which there is a space between the last name and the first name in the uttered voice and when a space character is included between the last name and the first name of the name registered in the destination list, searches for the name indicated in the search character string including the space character.

4. The information processing apparatus according to claim 3, further comprising:

an operation inputter to which an instruction by the user is input, wherein the destination searcher, when the destination search instruction is input via the operation inputter and when a space character is included between the last name and the first name of the name registered in the destination list, searches for the name indicated in the search character string including the space character.

5. The information processing apparatus according to claim 1, further comprising:

a destination list management server that manages the destination list using a directory service, wherein the hardware processor acquires the destination list from the destination list management server at a predetermined timing, and temporarily stores the destination list in a destination list storage area in an own apparatus or of an external server connected to the own apparatus, and the destination searcher searches for the name indicated in the search character string from the destination list stored in the destination list storage area.

6. The information processing apparatus according to claim 5, wherein the destination searcher, at a time of searching for the name indicated in the search character string, requests a temporary change in collation rule of the name indicated in the search character string used in the destination list management server to search for the name, and the temporary change in the collation rule is a change that when the language indicated by the utterance language information is a language in which there is no space between the last name and the first name in the uttered voice, the search is performed ignoring the space included between the last name and the first name of the name registered in the destination list.

7. A destination search method in an information processing apparatus that is connected to a voice processing server that analyzes text data transmitted from a voice input/output apparatus that converts an instruction by an utterance of a user to the text data and outputs the text data, and outputs an instruction obtained by analysis and utterance language information indicating a language of the utterance, the destination search method comprising:

when the instruction output from the voice processing server is a destination search instruction using a name as a search character string, determining on the basis of the utterance language information whether to include a space character in a target of the search in a case where the space character is included between a last name and a first name of the name in a destination list in which the name and information of destination of the name are registered, and searching for the name indicated in the search character string from the destination list on the basis of a result of the determination; and performing control to transmit a search result of the destination to the voice processing server.

* * * * *